March 18, 1958 — C. W. SKARSTROM — 2,826,908
INTEGRATING ADSORPTION DETECTOR FOR GAS CHROMATOGRAPHIC ANALYZER
Filed Aug. 1, 1955 — 5 Sheets-Sheet 1

Charles W. Skarstrom  Inventor
By Paul O. Dunham  Attorney

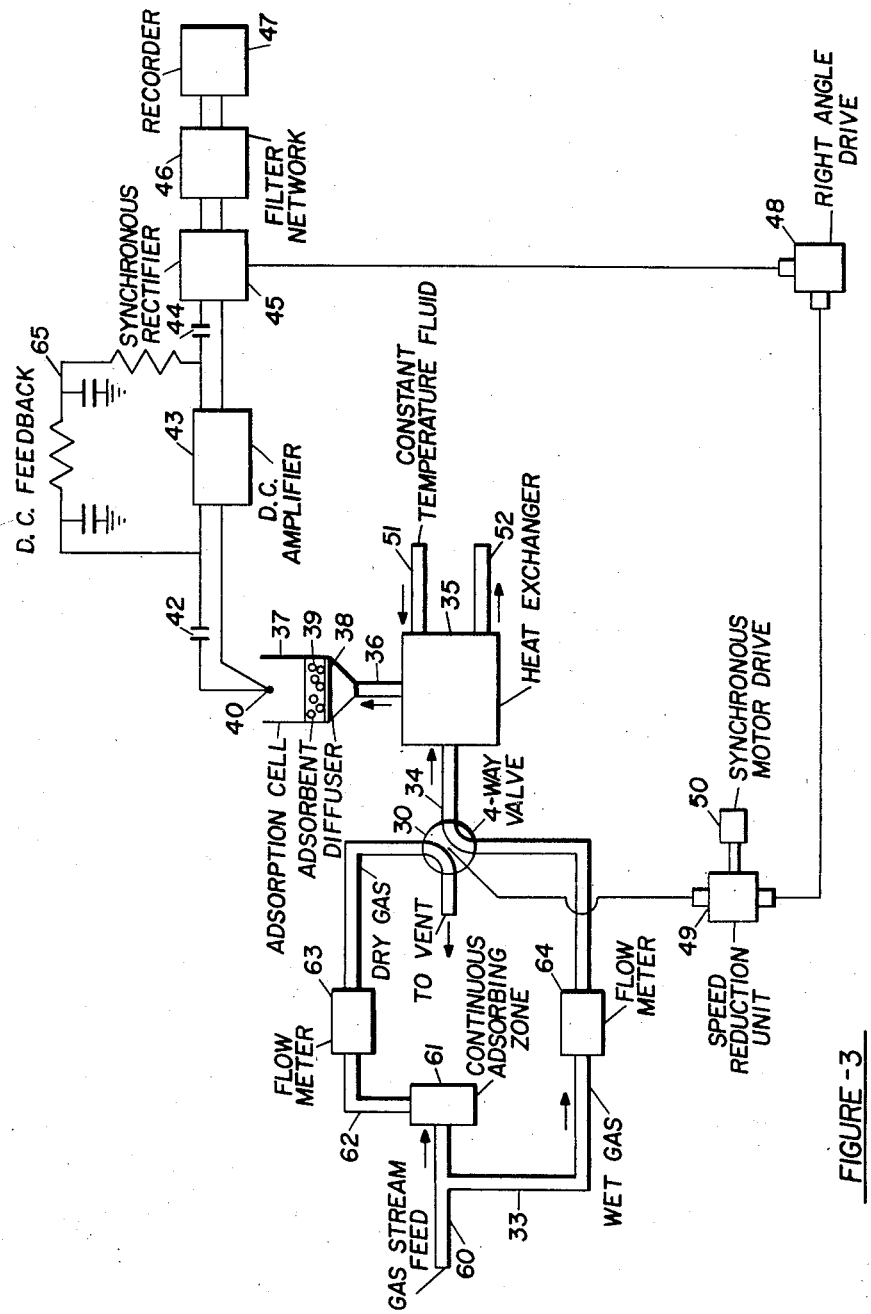

March 18, 1958

C. W. SKARSTROM 2,826,908

INTEGRATING ADSORPTION DETECTOR FOR GAS
CHROMATOGRAPHIC ANALYZER

Filed Aug. 1, 1955

Charles W. Skarstrom  Inventor

By  Attorney

March 18, 1958 C. W. SKARSTROM 2,826,908
INTEGRATING ADSORPTION DETECTOR FOR GAS
CHROMATOGRAPHIC ANALYZER
Filed Aug. 1, 1955 5 Sheets-Sheet 5

Charles W. Skarstrom Inventor
By *Small Dunham & Thomas*
 *Paul O. Dunham* Attorney

United States Patent Office 2,826,908
Patented Mar. 18, 1958

2,826,908

INTEGRATING ADSORPTION DETECTOR FOR GAS CHROMATOGRAPHIC ANALYZER

Charles W. Skarstrom, Montvale, N. J., assignor to Esso Research and Engineering Company, a corporation of Delaware Application August 1, 1955, Serial No. 525,688

9 Claims. (Cl. 73—23)

The present invention concerns an apparatus for analyzing mixtures of gases. More particularly, it concerns an apparatus for continuously or periodically determining the concentration of key components in a mixture of gases or a gas stream, especially where such components are present in very small amounts. The present invention also relates to an apparatus for periodically and alternately passing two gas streams past a thermal transducer in the presence or absence of an absorbent material whereby the transducer is caused to generate a measurable signal which is quantitatively related to the difference between the concentrations of the key component existing in the two gas streams, or the absence of said key components in one of said streams. The present invention further relates to an apparatus utilizing thermal transducers and adsorbent materials whereby variations in the signals emitted by the transducers as caused by the adsorption and desorption of vapors or gases by the transducers and/or adsorbents are detected and measured.

In addition, the invention relates to such an apparatus in a system for the determination of the relative content of the several components of a complex gas mixture, wherein the gas mixture is chromatographically separated into its component parts, and the nature and concentration of each component in the mixture is successively determined from a substantially continuous series of signals developed by the detection means, and wherein these signals are automatically integrated to provide a graphic record of such determinations, or to provide for automatic process control whereby the concentration of the respective components may be maintained in any predetermined relationship.

In various industrial processes and manufacturing operations, it is frequently imperative to know the concentration of one or more components of a process gas stream, as well as to determine any variation in the concentration of such components. The term "key component" as employed in this application is used to designate the component or components to be determined. Specific examples of such key components might be water vapor as present in a refinery gas stream, isobutane as contained in a mixture of N-butane and iso- and N-pentane, propane in air, or the components of a complex gas mixture such as one including ethane, propane, propylene and butane.

The term "gas" as used in the following description of the invention is intended to include materials that are conventionally considered to be gases as well as those materials that are conventionally considered to be vapors. Likewise "thermal transducers" are considered to be those devices such as thermopiles, thermocouples, resistance thermometers, thermistors and other thermo-electric pyrometers which generate electrical signals that are a function of the temperature of the environment in which they are placed.

Various types of apparatus and processes have been suggested for determining the amount of a key component gas in a mixture of gases. In accordance with the present invention the content of a key component in a mixture of gases is determined by a method which is based upon two phenomena: (1) the fact that the signals produced by various thermal transducers are markedly affected by variations in the concentration of one component of a gas mixture in which the transducer is placed, and (2) the property of adsorbers to give off heat when they are adsorbing a gas or vapor, and to abstract heat when they desorb such a material.

In connection with the first of these phenomena, it has now been found that the electrical signal generated by a thermal transducer when placed in a gas is upset markedly by sudden changes in the composition of the gas, even though the temperature of the gas has not been varied. Where the composition change of the gas is largely a change in the concentration of a single key component of the gas, the change in the electrical signal produced by the transducer has been found to be a function of the change in the concentration of the key component. This condition is often particularly evident when the key component is nearer its condensation temperature than are any of the other components in the gas.

In general, it has been found that a sudden change in the key component content of a gas mixture causes a change in the size of the electrical signal of the transducer. It has further been found that this change in the signal produced by a transducer is a transistory one, and that the signal will revert to its original value after a short period of time, providing the temperature of the gas mixture has remained the same.

Experiments have indicated that the magnitude of the electrical signal produced by a transducer as a result of the phenomenon described above is directly related to (1) the heat of adsorption of the key component on the transducer, (2) the mol fraction of the key component in the gas mixture and (3) the gas mixture pressure. The magnitude is also inversely related to the average molar specific heat of the gas mixture and to the heat capacity of the transducer. It is apparent that by maintaining the temperature and pressure of the gas mixture substantially constant and by using a transducer of low heat capacity, the magnitude of the signal is affected essentially only by changes in the amount of the key component present.

It is further apparent that the transducer must preferably possess a heat capacity small enough such that the signal emitted by it is capable of following changes in the key component concentration within a gas mixture or stream as reflected by the adsorption and desorption phenomena that take place on the surface of the transducer. In other words, the thermal time constant of the transducer must preferably be equal to or less than the time constant of the adsorption and desorption processes on the surface of the transducer.

It is apparent also that this phenomenon can be employed as an analytical tool in any case where the signals produced by the transducer can be detected and measured by means of potentiometers, millivolt meters, and the like.

It has now also been found that variations in the electrical signal of a transducer as caused by variations in the concentration of a key component in a gas mixture can be greatly augmented by use of adsorbent materials that selectively adsorb the key component from the gas. This use of selective adsorbents constitutes the second phenomena enumerated earlier, namely the property of adsorbents to give off heat when they are adsorbing a gas or vapor and to abstract heat when a gas or vapor is desorbed from them. The adsorbent can be coated directly on the surface of the transducer, or can be located near the transducer.

From the descriptive material that has already been presented, it will be recognized that a transducer signal will temporarily change in magnitude whenever the amount of a key component in the gas stream passing by it varies in magnitude. Therefore, by alternating two gas streams, it is evident that a fluctuating or A. C.-type electrical signal will be produced by the transducer when the concentration of the key component is different in the two streams. By first calibrating the measuring instrument using a gas stream containing known amounts of a key component, it has now been found that this apparatus and procedure can be employed to quantitatively determine unknown concentrations of a key component in a gas stream. In general, the transducer signal will also be affected by variations in the concentration of other component gases in the stream. The present apparatus and procedure, therefore, have primary utilization where the transducer signal is substantially a result of changes in the concentration of only the key component. Variations in the signal that are caused by concentration changes of other components in the gas stream can be essentially eliminated, however, by using the transducer in conjunction with an adsorbent that is selective toward the key component.

An important object of the invention is to provide an analytical apparatus for determining the concentration of a key component in a gas mixture. Another object of the invention is to provide means for continuously or intermittently determining the amount of water vapor in a gas, especially at low water vapor concentration levels. Also, it is an object of the present invention to provide a means for determining the absolute concentration of a key component in a given gas stream together with any slow changes in the concentration of the key component. Still further, it is an object of the present invention to provide a means wherein the concentration of one or more key components in a complex mixture of gases is determined in an apparatus which includes a chromatographic column ahead of the key component detection means and including means to supply a complex mixture of gases to the column in a stream of another gas as a carrier.

The invention and its objects may be more readily understood from the following description when it is read in conjunction with the accompanying drawings, in which—

Fig. 3 is a schematic diagram of apparatus for determining the concentration of a key component in a gas stream and for continuously developing a non-alternating signal to a measuring instrument;

Figure 7:
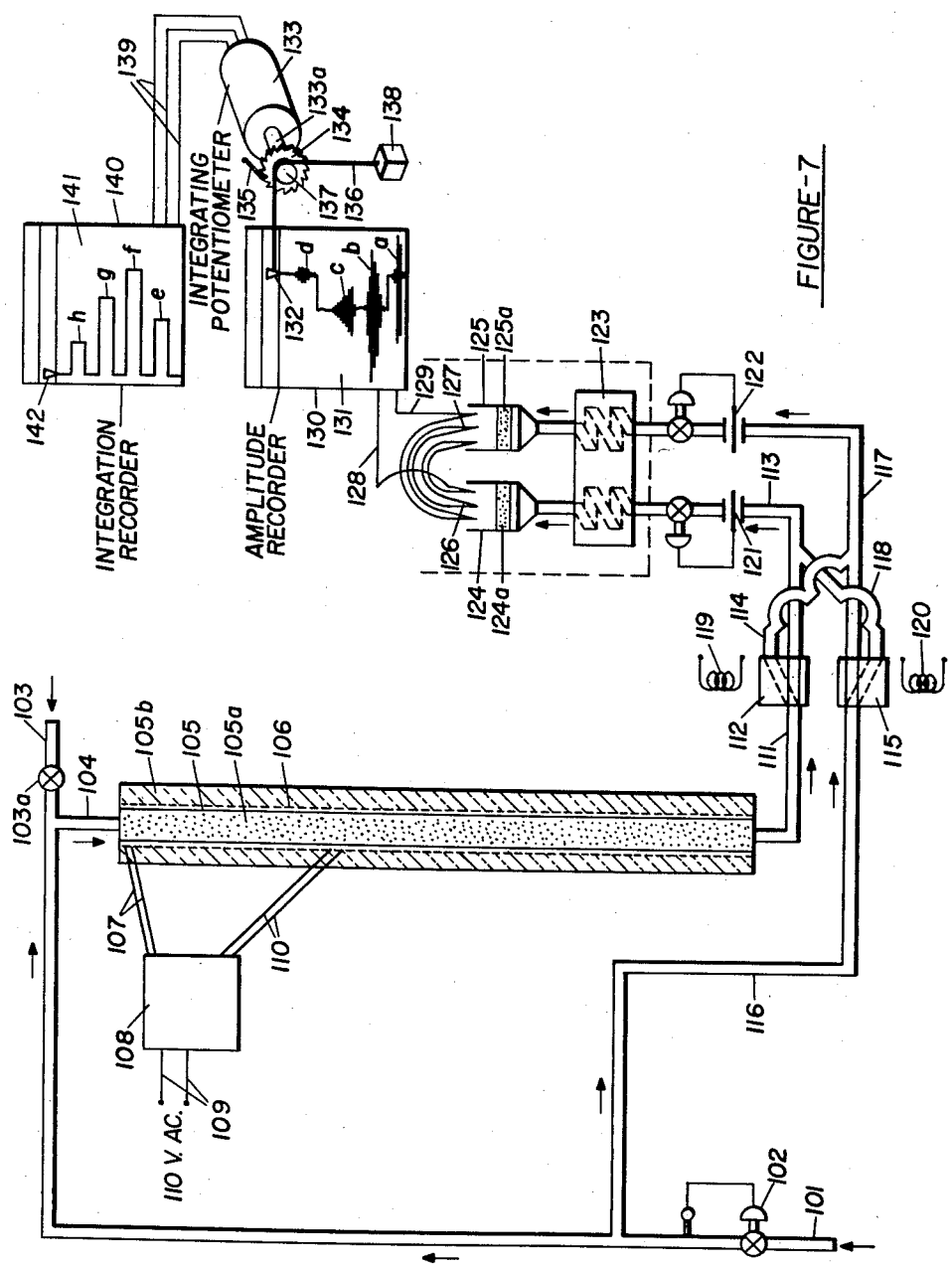

Fig. 7 diagrammatically illustrates the combination of detector means for determining the concentration of a key component in a gas stream, such as shown by Fig. 3, in a system for determining the concentration of each of the several components of a complex gas mixture, and including means for recording and integrating the respective signals produced by such detector means.

Figure 1:
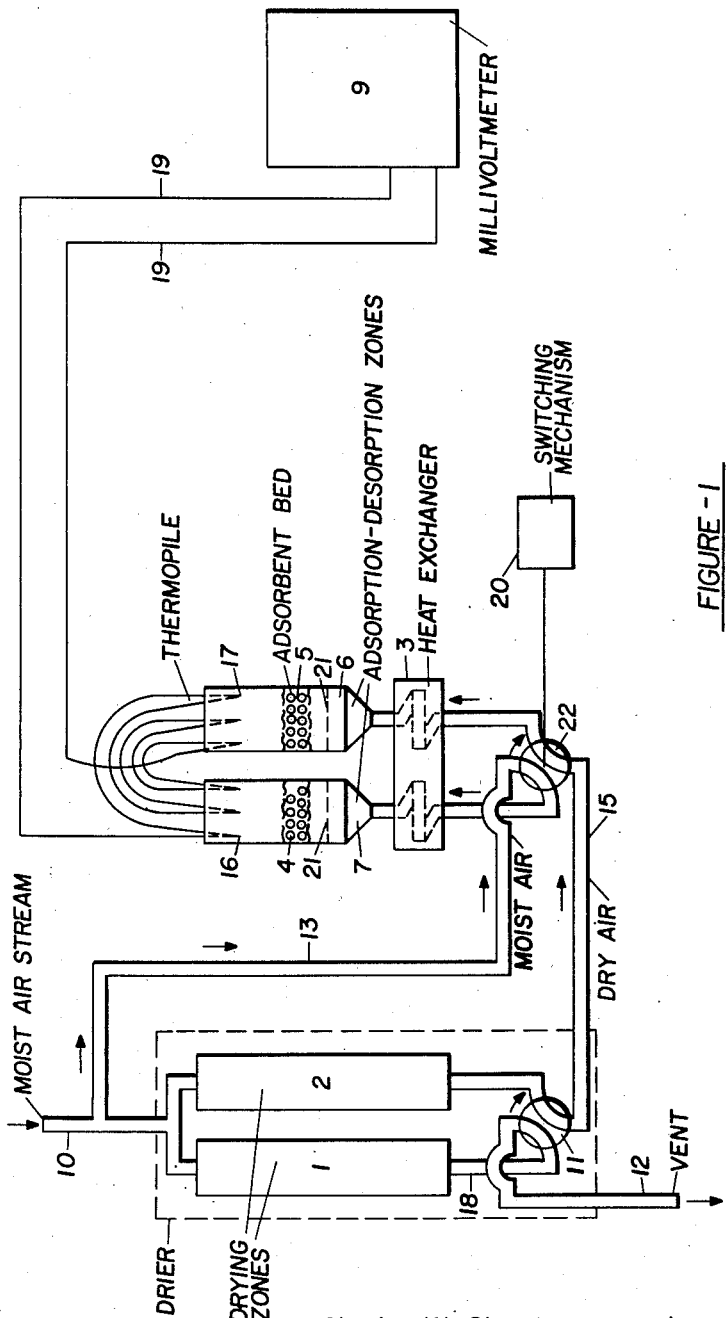
Fig. 1 is a schematic diagram of apparatus employed to determine the concentration of water vapor in air.

Referring first to Fig. 1, it will be noted that the apparatus depicted comprises drying zones 1 and 2, a four-way valve 11, a heat exchanger 3, adsorption-desorption zones 6 and 7, adsorbent beds 4 and 5, thermopiles 16 and 17, measuring instrument 9, and a second four-way valve 22. Apparatus actually employed in one set of experiments utilized commercially available silica gel dryers in zones 1 and 2, adsorbent beds of a beaded commercial silica gel desiccant called "sovabeads," thermopiles consisting of a bundle of 20 iron constantan thermocouple junctions each, and a 0–300° F. temperature recorder for iron constantan couples.

An air stream containing water vapor is introduced into the apparatus by means of line 10, and a portion of the stream is passed through either drying zone 1 or 2. Drying zones 1 and 2 may be packed with any suitable material for substantially complete removal of all of the key component or to provide a constant reference concentration of the key component (in this case water vapor) from the air stream. In the figure, drying zone 2 is being utilized for this purpose, as is evident from the position of the four-way valve 11. Drying zone 1 is preferably regenerated at this time, as for example by heating. The water vapor desorbed from the adsorbent in this zone passes through line 18, the four-way valve 11, and vent line 12.

A moist air stream is segregated by means of line 13 and passes through four-way valve 22 into heat exchanger 3. The dried stream leaving valve 11 passes through line 15, four-way valve 22, and thence into heat exchanger 3. The heat exchanger is of a character such that the two streams are kept separate, but are brought to substantially the same temperature. The gases leaving the heat exchanger should be preferably the same temperature as exists in adsorption-desorption zones 6 and 7.

As shown in Fig. 1, the moist stream leaving the heat exchanger passes into adsorption-desorption zone 7, while the dry stream passes into adsorption-desorption zone 6. As previously stated, it is assumed that zone 7 contains an adsorbent bed 4 of silica gel, while zone 6 contains an adsorbent bed 5 of the same material which is in equilibrium with the moisture content of the moist stream previously passed through it. The moist and dry air streams pass through the adsorbent beds, and thereafter contact the thermopiles 16 and 17 respectively, and are thence vented from the apparatus. Flow distributors 21 may be employed to improve flow conditions within the adsorption-desorption zones.

The moist air stream in passing through adsorbent bed 4 has water vapor removed from it by the silica gel until such time as the silica gel becomes saturated with water vapor under the existing conditions. The effluent air stream leaving bed 4 is initially substantially free of water vapor but gradually increases in water content as the silica gel becomes more and more saturated. This increase in the water content of the effluent air causes the electrical signal generated by thermopile 16 to increase. This increase in signal strength is augmented by the fact that the adsorbent bed in adsorbing water vapor from the moist stream gives up heat until such time as a state of equilibrium is reached. The amount of adsorbent employed is preferably such that a maximum signal from thermopile 16 is generated within a period of 0.1 to 10 minutes, and preferably about 2 minutes. In actual experiment a signal of 0.350 millivolt was generated by a thermopile consisting of 20 iron constantan couples in each zone 5 and 6 when employing a bed of adsorbent one centimeter in diameter and one centimeter deep, and an air rate of 0.1 C. F. M. The air in this instance was at a temperature of about 70° F. and contained about 0.02 vol. percent water vapor.

The dry air stream in passing through adsorbent bed 5 and past thermopile 17 in zone 6 removes water previously adsorbed by the bed and thereby is cooled. The effluent air leaving bed 5 contains water vapor, but never as much water vapor as was present in the air flowing from this bed at the end of the previous cycle when the moist stream was being passed through this same bed. As a result, thermopile 17 now is exposed to an air stream which has a gradually decreasing water content. It follows that the electrical signal developed by this thermopile therefore decreases temporarily, due to the fact that: (1) the air stream is being cooled by the desorption process in the bed, and (2) that the air stream contacting the thermopile has a decreasing water content.

Thermopiles 16 and 17 are connected in such a way that the signals produced by them are additive. The combined signal is then transmitted through suitable electrical leads 19 to a measuring instrument such as a millivolt meter 9.

The moist stream is passed through zone 7 and the dry stream through zone 6 for a length of time sufficient to generate a detectable signal and preferably for a length of time sufficient for the signal to reach a maximum value. The amounts of adsorbent in each adsorber zone are preferably such that a maximum signal is reached in a period of 0.1 to 10 minutes and preferably about 2 minutes. At this point valve 22 is actuated either manually or automatically as by a clock-driven switching mechanism 20 to pass the moist stream through zone 6 and the dry stream through zone 7. It is apparent from the foregoing description that the electrical signal transmitted to the measuring instrument is an alternating one, and if the instrument is of the recording type will leave an oscillatory trace on the recorder chart. As will be shown later, the magnitude of this trace is a function of the moisture content of the moist stream. More specifically, it is a direct measure of the differential moisture content between the moist and dry streams. Once the measuring instrument is calibrated with moist streams of known moisture contents, it may be employed to determine the moisture contents of streams having unknown moisture content.

While the foregoing description concerns the analysis of water vapor in air, it will be noted that analyses of many other gas mixtures can be carried out in this same manner. For example, the amount of one vapor or gas in a mixture of inorganic or organic vapors and gases, the amount of one hydrocarbon in a mixture of gaseous hydrocarbons, the amount of water vapor in a wide variety of gases, etc. may be achieved.

Similarly, a great number of adsorbents may be employed such as activated alumina, various metal oxides, adsorbent cotton, soft paper tissue, activated carbons, clays, fuller's earth, bone char, etc. It is preferred that the adsorbent be characterized by the fact that it can be readily desorbed of the key component by passing a gas stream relatively free of the key component through it.

Figure 2:
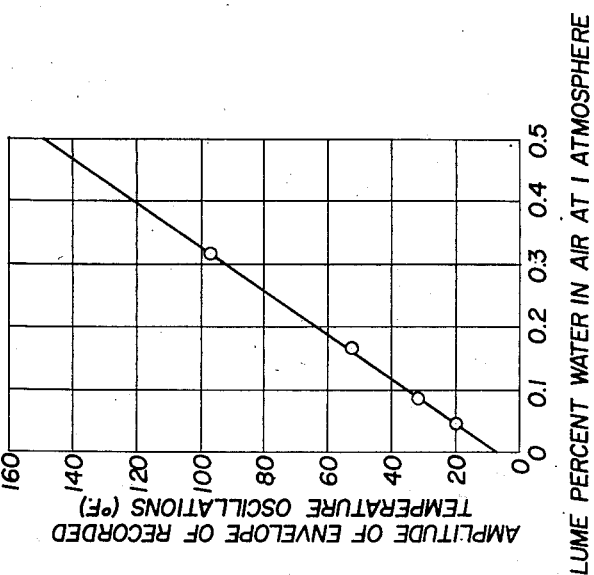
Fig. 2 illustrates the magnitude of the signal produced by small amounts of water vapor in air.

Fig. 2 depicts the accuracy and sensitivity with which an instrument and procedure of the type just described can quantitatively determine small amounts of water vapor in air at atmospheric pressure. The data illustrated were obtained by passing two streams of air alternately through two adsorbing cells, each containing one gram of "sovabeads" and 20 iron constantan thermocouples. The dry stream contained 4 parts per million or less of water vapor, while the moist stream contained various known concentrations of vapor. The dry and moist streams were reversed through each adsorbing cell once every two minutes. In other words, the dry stream was passed through one of the cells for a period of two minutes, while the moist stream passed through the other cell simultaneously for the same length of time. At the end of two minutes, the streams were reversed and sent through the opposite cells.

The combined electrical signal emitted by the thermocouples was transmitted to a millivolt recorder. It will be noted that the electrical signal generated by the thermocouples was a linear function of the volume percent of water contained in the air stream. It will be further noted that the present apparatus is extremely sensitive, inasmuch as very small amounts of water vapor were detected.

Another embodiment of the present invention is shown in Fig. 3, in which a gas stream is analyzed continuously for its key component content. The apparatus employed in this embodiment comprises a continuous adsorbing zone 61, flow meters 63 and 64, a four-way valve 30, a heat exchanger 35, an adsorption cell 37, a diffuser 38, and a bed of adsorbent 39. The adsorbent employed in the adsorbing zone, as well as in the adsorption cell is preferably of a type that is capable of strongly and selectively adsorbing the key component. The flow meters serve to measure and also preferably control the flow rates of moist and dry gas streams to the adsorption cell. It is preferred that these two rates be maintained about equal. Four-way valve 30 serves the function of permitting either the moist stream or the dry gas stream to flow to the adsorption cell. While one of these streams is flowing to the cell, valve 30 serves to vent the other stream. The heat exchanger may be of any conventional type and serves to bring the two gas streams to a constant temperature before their alternate passage through the cell. The temperature of the gas streams as they leave the heat exchanger should be substantially equal to the ambient temperature of the adsorption or "sensing" cell. The heat exchanger 35 illustrated in Figure 3 is maintained at a constant temperature by liquid flowing through lines 51 and 52.

The electrical detecting and measuring portion of the apparatus shown in this figure consists of a thermocouple junction 40, a capacitor 42, a D. C. amplifier 43, a D. C. feedback circuit 65, a second capacitor 44, a synchronous rectifier 45, a filter network 46, and a recorder or measuring instrument 47. The rectifier 45 may consist of a mechanical commutator which is phased with the four-way valve 30 by means of a synchronous motor drive 50, operating through a suitable mechanical transmission system. The transmission system in this instance consists of a speed reduction unit 49 and a right angle drive 48 in combination with suitable shafting illustrated by the dotted lines. This portion of the apparatus has been previously described in the pending Skarstrom application, S. N. 244,553, filed August 31, 1951, now abandoned.

A gas stream containing a key component, as for example air containing a small amount of water vapor, passes through line 60 to either: (1) the continuous adsorbing zone 61, line 62, and flow meter 63; or (2) through line 33 and flow meter 64. In the former instance, the key component is substantially removed to a constant low level, thus forming what may be referred to as a dry stream. In the case where the key component is water vapor, the adsorbent employed in the adsorbing zone may be silica gel, activated alumina, etc. The dry stream then flows through flow meter 63 where its flow rate is measured and preferably also controlled, and thence flows through line 62 to four-way valve 30. In the figure it will be noted that this valve is positioned so as to vent the dry stream from the apparatus.

The gas stream feed itself (containing the key component) passes through line 33, flow meter 64, and the four-way valve 30 to the heat exchanger 35. Here the gas stream is cooled or heated to any desired temperature and is then passed through line 36 to adsorption cell 37. In entering the adsorption cell, the moist stream first passes through a diffuser 38, which serves to distribute the flow of gas equally through the bed of adsorbent 39. As mentioned earlier, the adsorbent is of a character such that it is capable of substantially selectively adsorbing the key component. The adsorption process causes the bed to heat up, which in turn causes the gas stream itself to also heat up. This fact causes the thermocouple 40 to suddenly generate an increased electrical signal. As soon as the adsorbent has become sufficiently saturated with the key component so as to permit some of the key component to pass through the bed, the thermocouple will begin to generate an additional signal caused by the adsorption of some of the key component on its surface.

As has been explained earlier, the increase in the signal emitted by the thermocouple will reach a maximum in a certain length of time, depending upon a number of factors. In general, the moist stream needs to be passed through the adsorption cell for only such a period of time as is necessary for the thermocouple to develop a detectable signal. However, it is preferable that the moist gas be passed through the cell until the maximum signal attainable with the particular adsorbent, gas and thermocouple is reached. At this point, four-way valve 30 is actuated so as to vent the moist stream from the apparatus and to pass the dry stream through the heat exchanger and adsorption cell. As in the case of the apparatus described in Fig. 1, this procedure would result in the thermocouple 40 producing a fluctuating or slowly alternating D. C. type signal. This D. C. signal can be converted into a non-alternating D. C. signal in any conventional manner. A suitable method for achieving this objective is described below.

The thermocouple signal is transmitted by electrical circuit means to a D. C. amplifier 43. The D. C. amplifier illustrated may be of the character in which a mechanical commutator is employed to develop an A. C. voltage proportional in magnitude to the fluctuating D. C. input. This A. C. voltage is then amplified in a conventional A. C. amplifier. Thereafter a mechanical commutation device may again be employed to convert the amplified A. C. voltage to a slowly alternating D. C. voltage similar to the input which then may be suitably rectified and filtered for detection as a pure D. C. output.

It is preferred that a large capacitance condenser 42 be positioned in the input circuit of the amplifier. This capacitor performs the important function of preventing passage of high D. C. level outputs from the thermocouple and its associated wiring to the D. C. amplifier. Capacitor 42 serves to allow passage of the fluctuating D. C. voltage to the amplifier. It is particularly desirable to have the capacitor be of such size that the impedance of the capacitor at the fluctuating frequency is of the same order of magnitude as the impedance of the thermocouple or other such thermal transducer.

A resistance-capacitance network 65 is coupled to the output of the D. C. amplifier, providing a feed-back loop to the input of the amplifier. This R. C. network is chosen to have a long time-constant, so that any D. C. voltage appearing on the output of the amplifier will be fed back to the system. The network 65 serves to segregate any D. C. component from the amplifier output. The fluctuating D. C. component passes through coupling condenser 44 to a suitable rectifier 45, while any D. C. component is prevented by condenser 44 from reaching this portion of the electrical system. The rectifier 45 may consist of a mechanical commutator which is driven in synchronism with the four-way valve 30 to provide a true D. C. output proportional in magnitude to the fluctuating D. C. input supplied to the rectifier. The desired synchronization and phasing of the rectifier 45 with four-way valve 30 may be readily achieved by coupling the rectifier and the valve through suitable gearing such as the speed reduction unit 49 and the right angle drive 48 to the motor drive 50. It will be noted that the rectifier may be separately driven so as to follow the E. M. F. generated by the thermocouple through the entire pulsing cycle, or any portion thereof.

The output of the rectifier then passes through a suitable smoothing filter network 46, so that the original fluctuating D. C. signal may be converted finally to a non-fluctuating D. C. voltage. This final D. C. voltage output may then be suitably indicated as by means of a vacuum-tube voltmeter or other D. C. indicator, or recorded on recorder 18. The magnitude of the final D. C. voltage will be proportional to the magnitude of the fluctuating D. C. voltage generated by the thermocouple which in turn is a direct function of the amount of the key component contained in the gas stream feed to the apparatus.

The apparatus and procedure just described may be employed in conjunction with the same gas mixtures, analyses, adsorbents, etc. employed with the apparatus of Fig. 1.

Figure 4:
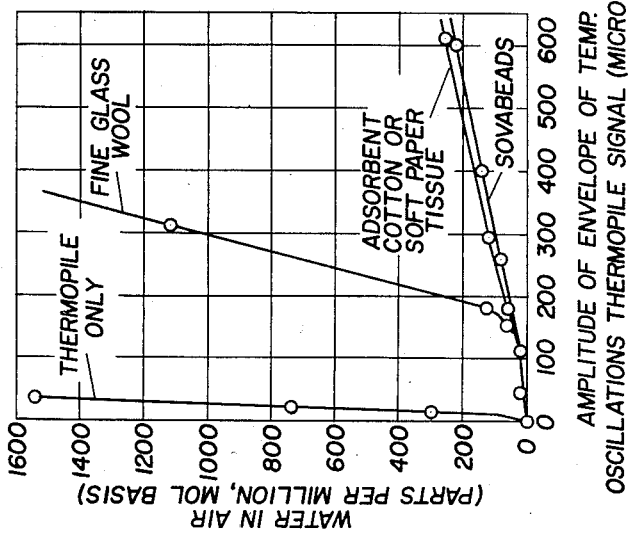
Fig. 4 illustrates the sensitivity with which the present type of apparatus and procedure can detect small amounts of water vapor in air. This figure also illustrates the effect of using an adsorbent material in conjunction with a thermal transducer, in this instance a thermopile.
Figure 6:
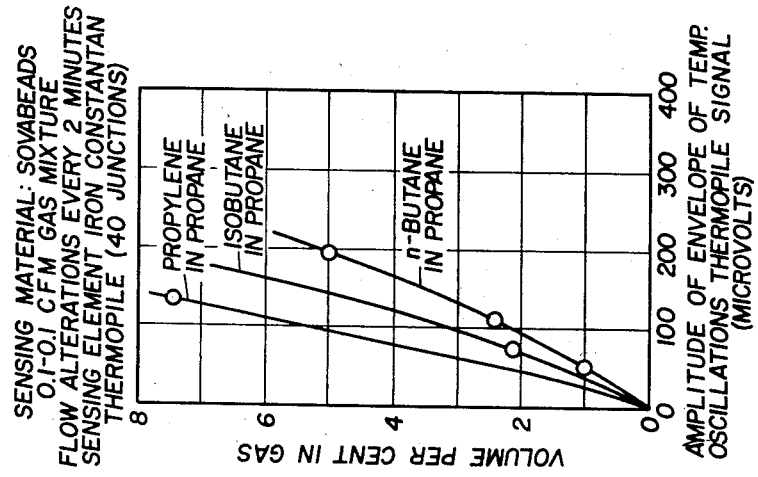
Fig. 6 shows the ability of the present invention for detecting amounts of one hydrocarbon gas in the presence of a second hydrocarbon gas.
Figure 5:
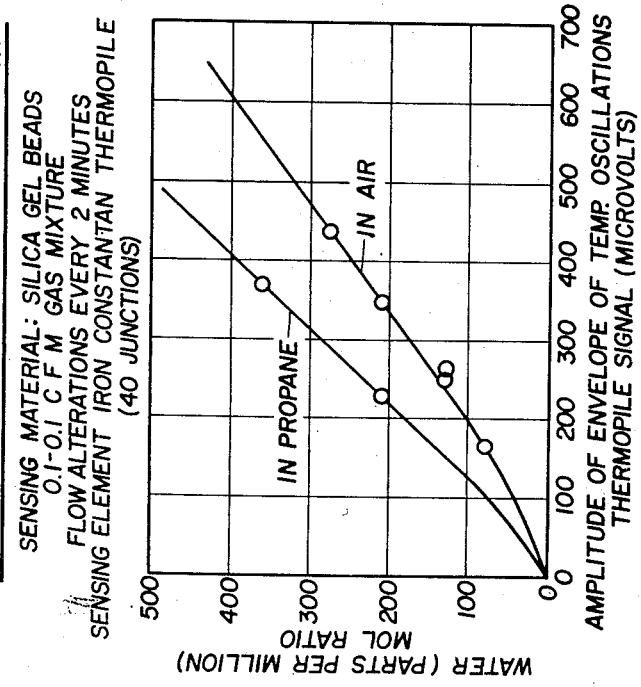
Fig. 5 illustrates the sensitivity of the present apparatus for determining small amounts of water vapor in a hydrocarbon gas as compared to air.

Figs. 4, 5, and 6 illustrate the sensitivity and accuracy with which the present apparatus and process can be employed.

Referring first to Fig. 4, two streams of air were alternately passed by two thermopiles each consisting of 40 iron constantan thermocouples. One stream was essentially anhydrous while the other contained varying amounts of water vapor. In general, the apparatus employed was of the type illustrated in Fig. 1. The gas (air) streams were alternated every two minutes past each thermopile.

The data in Fig. 4 show that the 40 junction iron constantan thermopile alone responds to water vapor in air although the signal is quite small. When the junctions are enclosed in a wad of fine glass wool, the sensitivity is markedly improved, especially in the region 0 to 50 parts per million mol ratio of water in air. Above 50 p. p. m. the response of glass wool diminishes to additional increments of water vapor. Because of its chemical inertness, fine glass wool therefore makes an excellent water sensing material in the region 0 to 50 p. p. m.

Other materials used successfully were adsorbent cotton and soft paper tissue. These materials were found to be almost as sensitive as the Sovabeads as shown in Fig. 4. In addition, like Sovabeads, they can be used over a wide range of 0 to 1 mol percent water in air. In general, a wide variety of materials may be used as water vapor sensing material. The choice is determined by chemical stability in the gas stream, desired range of calibration, ease of handling and availability.

Fig. 5 shows the calibration of the sensing element along with Sovabeads for water vapor in air and for water vapor in commercial propane in the range 0 to 400 p. p. m. As expected, the sensitivity for water in propane is less than in air.

Figure 6 shows the sensitivity of the same 40 junction iron-constantan thermopile sensing elements along with silica gel (Sovabeads) as the sensing material for detecting n-butane in propane, isobutane in propane and propylene in propane in concentration ranges of about 0 to 8 mol percent. While the sensitivity of the sensing elements and material is somewhat less in these instances than for the detection of water vapor in propane, the great value of this technique as an analytical tool is very apparent.

In obtaining the data illustrated in Figure 6, it will be noted that both the gas streams containing the unknown amounts of key component and the reference streams were dried to remove any water vapor before their passage through the sensing cells. The reference streams in each instance contained either no key component or a constant percentage amount of the key component.

It will be noted that various periods of flow alternations for the "unknown" gas streams and the reference gas streams were employed in obtaining the data given in the attached figures. In this connection it will be further noted that flow alternations having periods of time substantially different from those already given may be employed without departing from the scope of the present invention. It is particularly contemplated that gas flow alternations of about 0.1 second to 30 minutes may be used and that alternations of about 0.1 minute to 10 minutes are especially attractive.

In summary, the data presented by Figs. 2, 4, 5 and 6 show (1) flexibility in choice of materials for the water-sensing adsorbent material, (2) useful detection of water at very low concentrations, (3) detection of water vapor in various gases and (4) detection of various individual hydrocarbons present in another hydrocarbon gas.

The method according to the present invention as thus far set forth is also suitable for employment in the determination of the concentration of several key components in a complex gas mixture. When employed in this manner, a discrete amount of the unknown complex mixture of gases is first combined or mixed with a stream of air which serves as a carrier gas. Preferably the carrier air is substantially free of moisture and $CO_2$ although under certain conditions of operation, the normal $CO_2$ content of atmospheric air may be tolerated. The mixture of the unknown gaseous materials in air is then first processed successively substantially to remove these unknown materials from the stream of air, followed by the reintroduction of the several materials or key components into the stream of air substantially as separate additions at spaced intervals. For the purpose of separately removing and reintroducing the several key components of the gaseous sample from and into the carrier air stream, the use of an elution chromatographic technique is preferably contemplated, wherein the operating conditions are adjusted to provide predetermined intervals of delay between the elution of each of said key components.

As each of the key components of unknown concentration is reintroduced to the carrier air stream, this component and the air stream is passed through a detector mechanism of the character described, with reference to Figure 1 and Figure 3, alternately and in periodic sequence with a separate stream of the carrier air, producing a fluctuating increase and decrease of temperature in the effluent stream from the detector. The magnitude of the temperature fluctuation, as previously described, is then exhibited with reference to a predetermined magnitude of fluctuation produced by predetermined concentrations of the key components in a similar carrier air stream. The method thus summarized may be more clearly understood by reference to the system as illustrated by Fig. 7.

In the apparatus as illustrated by Fig. 7, the numeral 101 designates a supply conduit for a compressed air stream from a source not shown. A pressure control valve 102 is provided to maintain a substantially constant pressure in the conduit 101. The conduit 101 communicates with an adsorption column 105 by way of an inlet conduit 104. Also in communication with the inlet conduit 104 is a supply conduit 103, including a valve 103a, provided for the introduction of a gaseous material to be analyzed.

The column 105 is adapted to contain a body of an adsorptive material having an affinity for all components of the gaseous material introduced by way of the conduit 103 for which analysis is to be made. In the apparatus contemplated, this adsorptive material is preferably a solid adsorbent such as activated alumina, but other materials such as are well known in the art may be employed, including fibrous materials impregnated with adsorptive liquids. In Fig. 7, the adsorbent is designated by the numeral 105a. In effect, the adsorber provided is a chromatographic adsorption column.

The column 105 is also provided with means to maintain substantially constant temperatures therein, such as a resistance coil heater designated by the numeral 106 and connected by leads 107 through a temperature control instrument 108 to a source of electrical current designated by the numeral 109. The control instrument is also provided with thermocouple means, indicated by the numeral 110, siutably connected to the column. The numeral 105b designates heat retaining insulation for the column.

The numeral 111 designates a conduit providing an outlet from the column which is in turn connected to the inlet of a valve 112 which has dual outlets connected to conduits 113 and 114 respectively. A similar valve 115 is provided with an inlet conduit connection 116 communicating directly with the conduit 101 as shown. The valve 115 also has dual outlets connected respectively to the conduits 117 and 118. Each of the valves 112 and 115 is adapted to provide for alternate connection of the inlet thereof to each of the dual outlets. As shown, the valves 112 and 115 are also provided for automatic operation to switch the connection of the respective inlets between the dual outlets provided in each valve. In the apparatus as shown, the valves 112 and 115 are solenoid actuated valves, the solenoid actuating mechanisms being designated in the drawing by the numerals 119 and 120 respectively. The outlet conduits 114 and 118 are crossconnected respectively to the outlet conduits 117 and 113. Each of the conduits 113 and 117 is connected to the inlet of one of two detector cells 124 and 125. Flow through the respective conduits is maintained at a constant rate by means of flow controllers as designated by the numerals 121 and 122, and each conduit is passed through a heat exchange means, such as exchanger 123, in indirect relation to a heat exchange medium therein.

The detector cells 124 and 125 are substantially comparable to the cells as described with reference to Figs. 1 and 3, and include a contained body of an adsorbent material having an affinity for the several key components of the gaseous material introduced by way of the conduit 103. The numerals 124a and 125a designate such an adsorbent material. The detector means also includes temperature sensitive elements similar to those as shown in the Figs. 1 and 3, such as a thermopile, having terminal ends 126 and 127, made up of twenty pair of iron constantan thermocouples disposed in the outlet from each of the cells 124 and 125. The thermopile as previously described is designed to be sensitive to changes in temperature in the cells 124 and 125 and of the gas emitted therefrom, and to respond by emission of an electrical signal. Also as previously described, the thermocouples in the thermopile are connected in such fashion that the signals produced are additive, and of an alternating character, 180° out of phase. In the apparatus as shown, the thermopile is connected as by means of leads 128 and 129 to suitable means for amplifying, comparing and/or recording such signals. In the drawing, a recording instrument is designated by the numeral 130. As shown, the instrument 130 is adapted to provide a graphic record of the signals received both as to amplitude and time.

The instrument 130 illustrated in Fig. 7 is a recording instrument of generally conventional design, wherein a sheet of graph paper 131 is caused to be moved at a predetermined rate from top to bottom of the instrument face as represented in the drawing. The instrument also includes a recorder pen 132 actuated by signals as derived from the detector cells 124 and 125 so as to move from side to side horizontally across the surface of the graph paper 131. Movement of the pen and of the paper, leaves a trace on the surface of the paper which indicates the amplitude of the oscillating signals received by the instrument, and the period of time in which they are received. In the apparatus contemplated, provision is also made for integration of the signals recorded by means of the instrument 130. As shown, a tape 136 is connected at one end to the recorder pen 132, and at the other end to a weight 138, the tape being passed over a pulley 137 affixed to a ratchet wheel 134 rigidly mounted on and for rotation of the shaft 133a of a potentiometer 133. A pawl 135 permits rotation of the ratchet wheel pulley and shaft in one direction only during recording oscillation of the pen 132. Other means for one way restriction on movement of the potentiometer shaft may be provided, and in addition suitable automatic means such as a programming timer may be connected to the potentiometer shaft to restore the potentiometer to a zero position.

The E. M. F. produced by the integrating potentiometer 133 during rotation of its shaft, is transmitted by means of elecrical leads 139 to an integration recorder instrument 4. This instrument is substantially similar to the instrument 130, providing a sheet of graph paper 141 movable from top to bottom of the instrument face, as indicated in the drawing, and a recorder pen 142 movable over the surface of the graph paper laterally from side to side thereof. This instrument, however, produces a bar graph record. In the showing provided by Fig. 7, the tracing of signals received by the recorders 130 and 140 respectively is representatively shown. The significance of these signals will be subsequently described.

In operation of the apparatus as illustrated by Fig. 7, according to the method contemplated by the present invention, a stream of compressed air is introduced by way of the conduit 101, the pressure of the stream being controlled by means of the valve 102. Preferably the air as thus introduced is at least moisture free. The air from conduit 101 passes through the column 105 by way of inlet conduit 104 and outlet conduit 106 to be discharged into the three-way valve 112 through the inlet thereof. Air flow through the system is normally contemplated to be in the range of from about 0.02 to about 2.0 cubic feet per minute.

The adsorbent material in the column 105 may be any material having an affinity for all or at least the key components of the gaseous material to be analyzed. For gaseous hydrocarbons, silica gel may be used, but activated alumina is a preferred adsorbent material. The volume of such material is preferably such as to provide for complete adsorption of any predetermined amount of the material to be analyzed, while permitting subsequent desorption without excessive overall hold-up time or overlapping discharge of the material components as discharged. Temperatures and pressures maintained in the system will be governed substantially by the physical characteristics of the material to be analyzed, and are critical only to the extent that the materials are preferably to be maintained in a gaseous condition, and do not require excessive amounts of adsorbent or excessively enlarged equipment to obtain the operating results desired. Under such conditions, pressures may range from about 5 to about 100 pounds per square inch gauge, and temperatures from about 100 to about 400° F.

Air flow having been established through the conduits 101 and 116, and through the column 105, the valves 112 and 115 are operated cyclically by the actuating means provided, such as the solenoids 119 and 120. Preferably, the actuating means are operatively controlled by means such as an electrical timer device or a switching device such as shown in Figs. 1 and 3. The cycle time may be any time unit selected, but in order to maintain uniformity and selectivity of the detector, and to obtain good results from small samples, it is preferred that the cycle time be measured in seconds. It has been found that a cycle time of 5 seconds provides optimum results in most instances. By cycle time, it is meant that the valves 112 and 115 are switched so as to provide flow from their inlets through each of their outlets for a specific period of time, alternately through each outlet and in an opposite sequence.

The valves 121 and 122 as shown in Fig. 7 are designed to produce substantially the same and characteristic flow through the detector cells 124 and 125 as provided by and through the respective valves and cell counterparts of the apparatus as illustrated in Figs. 1 and 3. As now shown, the timing mechanisms and solenoids 119 and 120 are arranged to provide for flow from the conduit 111 through valve 112, conduit 113 and cell 124, while simultaneously providing flow from conduit 116, through valve 115, conduit 117 and cell 125, and then upon operation of the cycling devices, to pass the flow through valve 112 through conduits 114 and 117, and cell 125, while at the same time, passing the flow through valve 115 through conduits 118 and 113, and cell 124. The cycled flow thus provided is repetitive during operation of the system, producing a cyclic interchange of the streams passed through each of the cells 124 and 125.

Having established a flow of air through the system in the manner described, a discrete sample of the gaseous material to be analyzed is then introduced by way of the conduit 103. This sample is mixed with the air as it passes into the column 105, and then the several components are separated from the air stream chromatographically by the adsorbent action of the material 105a. As the air flow through the column 105 is continued, the sample component for which the adsorbent has the least affinity is first desorbed thereby, and the others in the order of increasing affinity. This first component is thus eluted, and passes through the conduit 111 as a mixture thereof in air. The air and first component mixture is then cycled through the valves 112 and 115 in opposite sequence with the reference air stream passed through conduit 116, and thereby through the cells 124 and 125. The length of column 105, the volume of adsorbent therein, the volume of the sample, and the rate of flow of the air stream all serve to determine the time required to obtain separation from and elution of the several sample components by the air stream. These factors also determine the time interval between elution periods and the period of elution of each component as well. The methods for determination of these factors are believed to be well known in the art. With continued air flow through the column, each of the several components are similarly eluted and passed to the cells 124 and 125.

As previously indicated, each of the cells 124 and 125 also contains a body of an adsorbent material which has an affinity for each of the several key components of the sample. Any of a number of well known adsorbents may be thus employed, but for the purpose of this invention, and especially for the analysis of hydrocarbon gases, it is preferred to employ an adsorbent material such as activated carbon. Only a very small quantity of the adsorbent is required in the cells 124 and 125. In a preferred embodiment of the invention, only 0.4 cubic centimeter of activated charcoal were employed when using cycle times of from about 5 to 7.5 seconds.

As previously described with reference to Figs. 1 and 3, as the several components are eluted or desorbed from the column 105 by the continued air flow through conduit 101, each component is alternately adsorbed on and desorbed from the material in the cells 124 and 125. During the adsorption phase of each cycle, that is when the flow stream is a mixture of air and a sample component, the temperature of the respective cells and the effluent therefrom is raised by the effect of the heat of condensation of the particular sample component. During the desorption phase of the cycle, while the reference air stream is passed through each cell, the temperature of each cell and the effluent therefrom is reduced.

The alternating increase and decrease in temperature in each cell is sensed by means such as the thermopile to produce an alternating signal in which the E. M. F. produced by the increase of temperature in one cell is added to that produced by the simultaneous decrease of temperature in the other cell. The resulting combined signal is also alternating in character, and when transmitted to the recorder instrument 130 produces oscillatory movement of the recorder pen 132 to impress a trace on the surface of the graph paper 131. This trace has an amplitude which is determined by the magnitude of the combined signals from the thermopile, and an overall length which is directly proportional to the amount of any component passed through the cells. At the same instrument sensitivity setting, an equal amount of a given component will produce a trace of the same length in any instance, and each component of a mixture of gaseous materials will exhibit a characteristic signal and graphic trace pattern. Thus by initial calibration of the instrument with gaseous mixtures of known composition, the composition of similar unknown mixtures may be determined by graphic comparison. Also, by the employment of suitable amplifiers, relays and other electrical instrumentation of types well known in the art, the signals derived from the cells 124 and 125 may be utilized to activate process controls in such fashion as to maintain any desired composition in a product flow stream.

Although the total length of the trace produced by the amplitude recorder instrument 130 may be measured manually, it is preferable that it be directly exhibited in a form which will permit simple comparison. For this purpose, in the apparatus as shown in Fig. 7, provision is made for converting the trace record of the instrument 130 to a representative bar graph record.

This conversion is accomplished by the integrating potentiometer 133 and integrating recorder 140 described above. Although in the bar graph produced by movement of the recorder pen 142 the trace representing each component is only one-half the length of the trace produced by the recorder 130, it remains proportional to the amount of any component element of the sample analyzed. A refinement of the apparatus as disclosed by reference to Fig. 7 would preferably include a programming timer mechanism which could be employed to reset the integration recorder and potentiometer at the end of each component detection sequence, as well as to set and reset both recorders for any desired degree of sensitivity.

The sensitivity of the recorder instruments, determines the extent of movement of the recorder pen laterally over the graph paper for any given signal magnitude. High and low instrument sensitivities are determined on the basis of the maximum signal input which is required to move the recorder pen a predetermined "full scale" distance over the chart surface and should be set in inverse relation to the quantities of the component to be recorded. The signals produced by components present in relatively large amounts preferably will be recorded at sensitivities lower than those of the components present in smaller amounts.

In Fig. 7, the chart papers 131 and 141 show a trace which is representative of a sample gas mixture which was an LPG mixture essentially consisting of—

| | Percent |
|---|---|
| Ethane | 5 |
| Propane | 55 |
| Propylene | 37 |
| Butane | 3 |

The adsorption column employed, comprised two column sections each ten feet long and having a one-half inch internal diameter, the sections being connected in parallel, and each filled with activated alumina of 14 to 28 mesh. The column temperature was maintained at about 150° F. and flow through the system was maintained at about 0.1 cubic feet per minute. Pressure in the system was established at about 15 pounds per square inch gauge. Cycling time of the valves was set for approximately five seconds flow in each cycle phase.

Under such conditions, 25 cubic centimeters of the gas mixture were injected into the air stream of conduit 101 by way of the conduit 103, and the operating procedure previously described was followed to produce traces on the chart papers 131 and 141 substantially as shown. Ethane was the first component to be eluted or desorbed from the column 105. As it appeared in the carrier air stream, and was cycled through the detector cells 124 and 125, the heating and cooling effect produced by adsorption and desorption in the cells resulting in the production of the trace indicated at "a" on the amplitude recorder chart 131, and at "e" on the integration recorder chart 141. The traces designated b, f; c, g; and d, h; respectively, represent the corresponding records produced by the components propane, propylene and butane in that order. In repeated runs of samples of the same composition identical traces were produced.

In making these analyses, it was known that the ethane and butane were present in the smaller amounts. Therefore, the recorder sensitivities were adjusted to compensate for the differences in signal magnitudes to be expected. Specifically the signals for the ethane and butane components were recorded with a full scale sensitivity of 0.86 millivolt, while those for the propylene and propane components were recorded at a full scale sensitivity of 6.0 millivolts.

The method and apparatus described also have been employed for the detection of propylene in crude ethylene. A series of one liter samples of crude ethylene containing various amounts of propylene in the range of from 0 to 2000 parts per million were passed through an apparatus comprising a single chromatographic column five feet long and one and one-half inches in diameter, the column being maintained at a temperature of 200° F. The other operating conditions being substantially as set forth with reference to the determination of the components of an LPG mixture. The results obtained demonstrated a system sensitivity of plus or minus 30 parts per million of propylene in the samples employed.

The present application is a continuation in part of an application Serial No. 306,993 filed in the United States Patent Office under date of August 29, 1952, now abandoned.

What is claimed is:

1. An apparatus for determining variations in the concentration of a key component contained in a mixture of gases, comprising a casing which defines an adsorption chamber having an inlet and an outlet, a multiport valve, a discharge port opening from said valve into communication with said chamber inlet, a first inlet port in said valve, a first supply conduit communicating with said first valve inlet port, a second inlet port in said valve, a second supply conduit communicating with said second valve inlet port, means for supplying a gas mixture containing an unknown concentration of said key component through said first supply conduit, means for supplying a gas mixture containing a predetermined, constant concentration of said key component through said second supply conduit, a timed valve actuating means for alternately and periodically placing said first and second supply conduits in communication with said chamber inlet through said valve, heat exchange means for maintaining a constant temperature in the gas mixture entering said chamber by way of said inlet, and electrical means, including a thermal transducer disposed at the outlet from said chamber for sensing temperature fluctuations in the heat of adsorption and desorption produced in said chamber by passage of the gas mixture therethrough, and means for exhibiting said temperature fluctuations as a measure of the unknown concentration of said key component in the gas mixture supplied through said first supply conduit with reference to the temperature fluctuations produced by known concentrations of said key component in a gas mixture initially supplied through said first supply conduit.

2. An apparatus according to claim 1, wherein said chamber contains a bed of adsorbent material having a total volume such as substantially to provide a maximum equilibrium adsorptive capacity for said key component in a period substantially equal to the operating period of said timed valve actuating means.

3. An apparatus for determining variations in the concentration of a key component in a mixture of gases, comprising a pair of casing members each defining a separate adsorption chamber having an inlet and an outlet, a multiport valve, a pair of discharge ports in said valve each of which opens from said valve into communication with one of said casing inlets, a pair of inlet ports in said valve, a pair of supply conduits each communicating with one of said inlet ports, means for passing a gas mixture containing an unknown concentration of said key component through one of said supply conduits, means for passing a gas mixture containing a predetermined, constant concentration of said key component through the other one of said supply conduits, a timed valve actuation means for placing said respective supply conduits in communication with said respective chamber inlets periodically and in opposite alternate sequence through said valve, heat exchange means for maintaining a constant temperature in the gas mixture entering each of said chambers, and electrical means including a thermal transducer disposed at the outlet from each chamber for sensing temperature fluctuations in the heat of adsorption and desorption produced in each chamber by passage of a gas mixture therethrough, and means for exhibiting said temperature fluctuations in combination as a measure of the unknown concentration of said key component in the gas mixture supplied through one of said supply conduits with reference to the temperature fluctuations produced by known concentrations of said key component in a gas mixture initially supplied through said last mentioned supply conduit.

4. An apparatus for determining the content of a key component in a gaseous material which comprises a conduit system, a chambered analysis portion defined in said conduit system, said chambered analysis portion substantially constituting an adsorption zone, means for introducing two separate streams of gaseous materials into said conduit system, including means for cyclically alternating flow of each of said separate streams through said conduit system and said chambered analysis portion, the first one of said streams containing an unknown content of said key component and the second of said streams containing a known content of said key component, means for maintaining the temperature and pressure of said streams substantially constant as introduced into said adsorption zone, means in said adsorption zone adapted to remove at least a portion of said key component from said first stream of gaseous material by adsorption thereof and to give up said adsorbed key component to said second stream of gaseous materials by desorption, temperature sensitive means exposed in said adsorption zone, said temperature sensitive means being adapted to generate electric signals proportionate to any increase and decrease of temperature cyclically and alternately produced in said adsorption zone by the heats of adsorption and desorption of said key component therein, and means for exhibiting said electrical signals generated as a measure of the unknown content of said key component in said first stream of gaseous material by reference to electrical signals thus generated by a known content of said key component in a reference stream of gaseous materials previously passed through said conduit system.

5. An apparatus according to claim 4, wherein said chambered analysis portion comprises two chambers separately defined in said conduit system, and said means for introducing said two separate streams of gaseous materials into said system includes a supply conduit for each stream, a valve having a pair of inlet ports and a pair of outlet ports, each of said inlet ports communicating with one of said supply conduits for each stream, and each of said outlet ports communicating with one of said chambers, and means for actuating said valve so as alternately and separately to place each of said supply conduits in communication with each of said chambers through said valve.

6. An apparatus according to claim 4, wherein said temperature sensitive means is a transducer element.

7. An apparatus according to claim 4, wherein said means for introducing said separate streams of gaseous materials into said conduit system, comprises a chromatographic adsorption column adapted to contain a body of a material capable of adsorbing and desorbing each component of a complex gaseous mixture serially, said column having an inlet and an outlet, a supply conduit for moisture free air connected to said column inlet, a supply conduit for a complex gaseous mixture communicating with said air supply conduit, a conduit communicating between said column outlet and said conduit system, and a conduit communicating directly between a source of moisture free air and said conduit system.

8. An apparatus as defined in claim 6 in which said transducer element is a thermopile.

9. An apparatus according to claim 7, and including means for establishing and for maintaining substantially constant conditions of pressure and temperature in said chromatographic adsorption column.

References Cited in the file of this patent

UNITED STATES PATENTS

| | | |
|---|---|---|
| 2,444,613 | McCombie et al. | July 6, 1948 |
| 2,579,352 | White | Dec. 18, 1951 |